United States Patent [19]

Gideon et al.

[11] Patent Number: 6,158,750
[45] Date of Patent: Dec. 12, 2000

[54] LIFT AXLE ASSEMBLY

[75] Inventors: Timothy A. Gideon, West Lafayette; Dean F. Bartolone, Lafayette; James A. Smith, Otterbein, all of Ind.

[73] Assignee: Fluidrive, Inc., Brookston, Ind.

[21] Appl. No.: 09/087,237

[22] Filed: May 29, 1998

[51] Int. Cl.$^7$ .................................................. B60G 1/00
[52] U.S. Cl. ............................... 280/86.5; 280/124.153; 267/281
[58] Field of Search ........................... 280/124.158, 86.5, 280/683, 124.153; 267/279, 281, 154; 384/220, 221, 222

[56] References Cited

U.S. PATENT DOCUMENTS

| | | |
|---|---|---|
| 3,510,149 | 5/1970 | Raidel . |
| 3,612,572 | 10/1971 | Raidel . |
| 4,293,145 | 10/1981 | Taylor . |
| 4,491,429 | 1/1985 | Matoba et al. ......................... 384/221 |
| 4,773,670 | 9/1988 | Raidel, II . |
| 5,015,004 | 5/1991 | Mitchell . |
| 5,090,495 | 2/1992 | Christenson . |
| 5,230,528 | 7/1993 | Van Raden . |
| 5,403,031 | 4/1995 | Gottschalk . |
| 5,505,481 | 4/1996 | VanDenberg . |
| 5,566,929 | 10/1996 | Thurow . |
| 5,588,665 | 12/1996 | Pierce et al. ........................... 280/704 |
| 5,620,194 | 4/1997 | Keeler . |
| 5,924,712 | 7/1999 | Pierce ................................. 280/124.13 |

OTHER PUBLICATIONS

Hendrickson Turner 1990 Brochure 4 pages.
Hendrickson Turner Product Information, 3 pages.
Watson & Chalin Mfg., Inc. Product Information 1990 3 pages.

*Primary Examiner*—Paul N. Dickson
*Assistant Examiner*—Faye M. Fleming
*Attorney, Agent, or Firm*—George Pappas

[57] ABSTRACT

A lift axle assembly for supporting an auxiliary axle and wheels and selectively moving the auxiliary axle between in use and storage positions. The auxiliary axle is supported using two sets of upper and lower support arms pivotally connected between saddles attached to the axle and support hangers which are attached to the vehicle. Lift air springs selectively push the upper support arms vertically upwardly for rotating the support arms and placing the auxiliary axle in the storage position. The pivotal connections of the lower support arm as well as the pivotal connection of the upper support arm to the support hanger are of a bushing type allowing both rotational motion about the axis of rotation and coning for allowing twisting of the support arms about their longitudinal axes. The pivotal connection between the upper support arms and the saddles are of an antitwist type allowing pivotal motion about the axis of rotation but preventing coning or twisting of the upper support arms about their longitudinal axes.

25 Claims, 2 Drawing Sheets

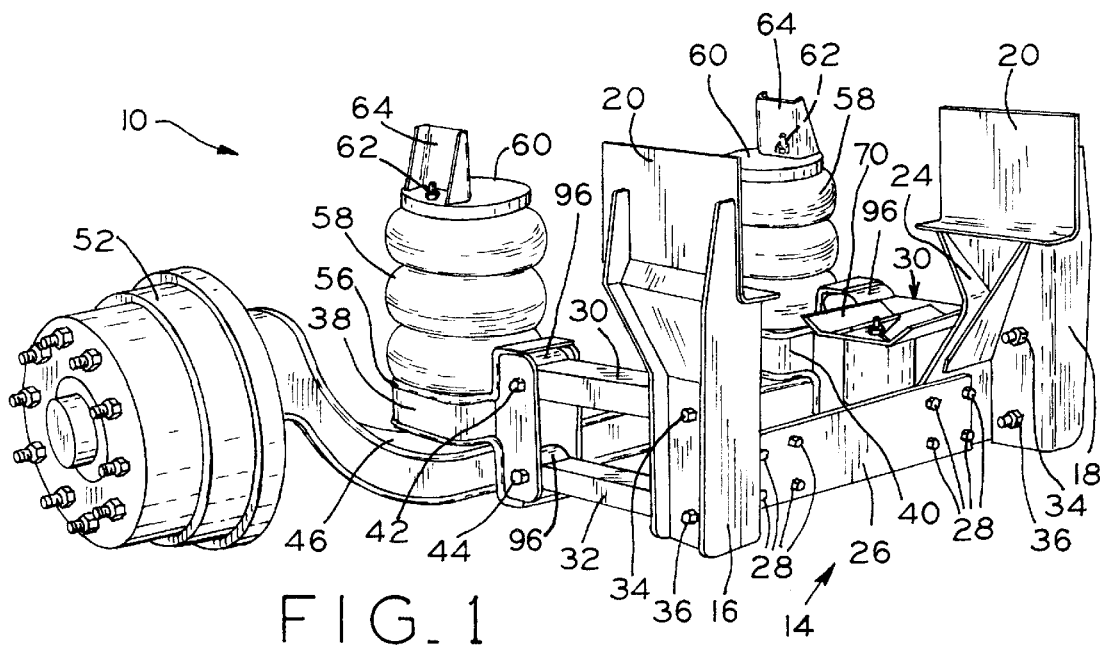
FIG_1
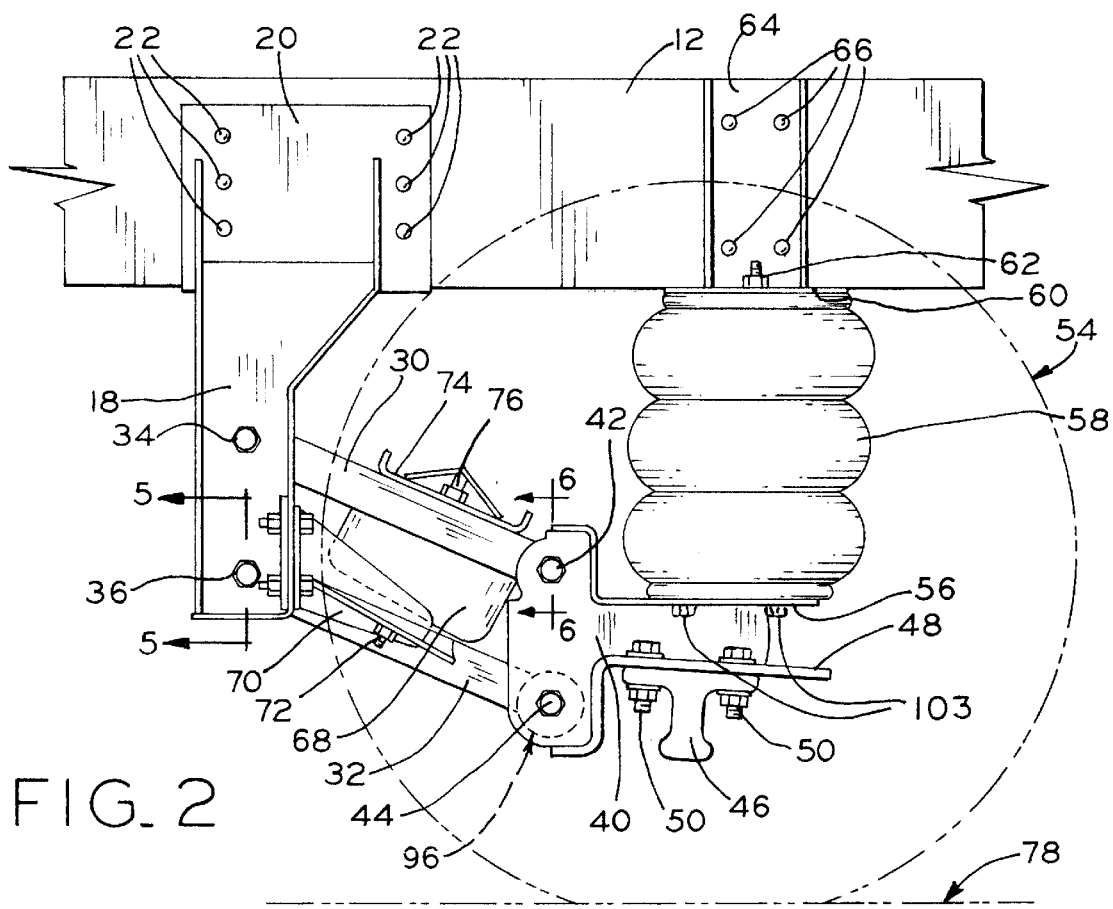
FIG_2

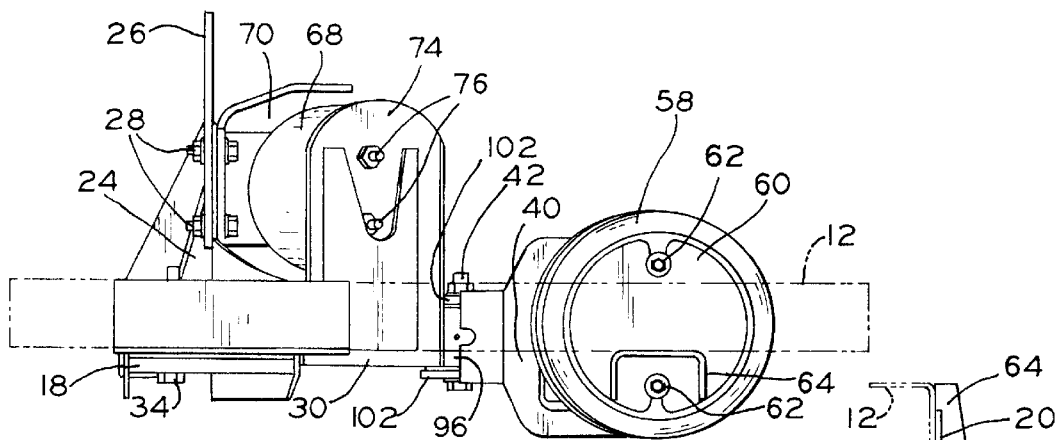
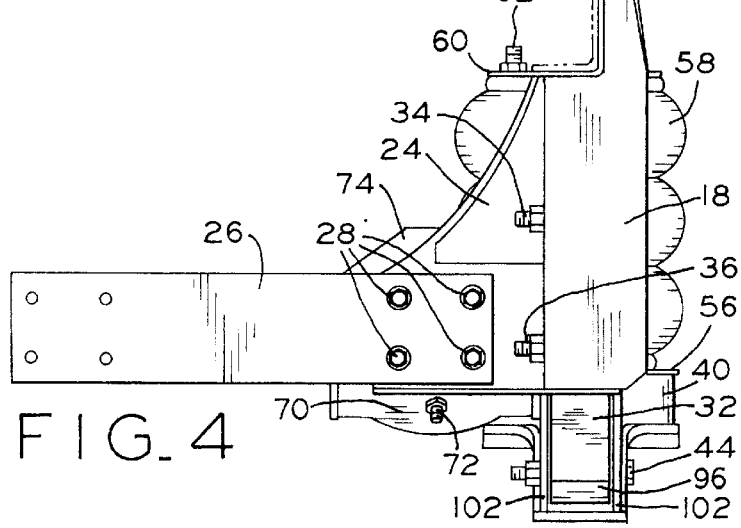
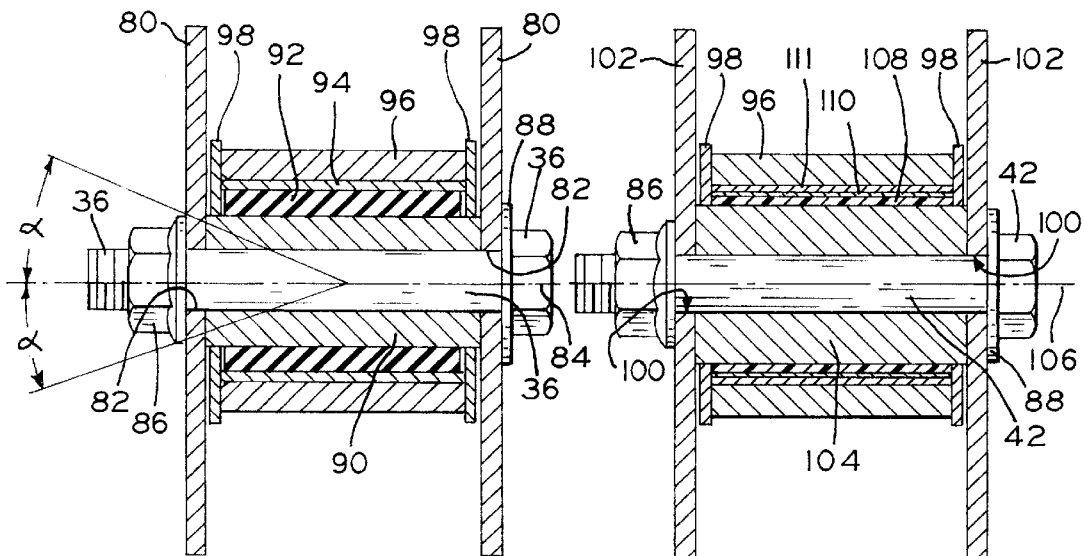

LIFT AXLE ASSEMBLY

TECHNICAL FIELD

The assembly of the present invention generally relates to auxiliary lift axle suspension systems for wheeled vehicles. More specifically, the present invention relates to a lift axle assembly of improved durability for selectively lowering and raising an auxiliary axle and wheels of a wheeled vehicle.

BACKGROUND OF THE INVENTION

Auxiliary axles and wheels are today commonly used in wheeled vehicles especially on trucks and trailers for selectively more evenly distributing the vehicle load onto the road surface. The auxiliary axle not only increases safety but also provides for a means to conform with highways weight capacity laws. Because the auxiliary axle and wheels are only needed while carrying heavier loads, many different assemblies and apparatus have been devised for selectively raising the auxiliary axle and wheels when the wheeled vehicle is operated in an empty or lightly loaded condition and for lowering the auxiliary axle and wheels in contact with the road surface when operating under a heavy loaded condition.

Lift axle assemblies are typically attached to the frame of the wheeled vehicle in the "pusher" position between the vehicle back driven wheels and the front steering wheels or the "tag" position behind the back driven wheels. A frame including a pair of hanger brackets are attached to the wheeled vehicle frame and extend downwardly therefrom. One or more arms are pivotally attached to the hangers and extend toward the rear of the vehicle whereat they are also attached to the auxiliary axle. A pair of springs, typically air springs, are located between the auxiliary axle and the vehicle frame in a manner whereby at least a part of the vehicle load can be transferred from the frame through the support air springs and to the auxiliary axle and wheels. The support air springs are selectively filled or energized with air for effectively partially transferring the vehicle load therethrough. For raising the auxiliary axle and wheels, the support air spring is de-energized or deflated and a lift mechanism is provided for pivoting the support arms upwardly and thereby raising the auxiliary axle and wheels off of the road surface and up underneath the wheeled vehicle frame. Typically, the lifting mechanism utilizes a lift air spring which is selectively inflated when the support air spring is deflated thereby causing the auxiliary axle and wheels to be lifted. The lift air spring is deflated when the support air springs are inflated for allowing the auxiliary axle and wheels to be lowered onto the road surface. Examples of such prior lift axle assemblies are shown and described in Gottschalk et al., U.S. Pat. No. 5,403,031 and Van Raden et al., U.S. Pat. No. 5,230,528.

The prior art lift axle assemblies, however, are not without drawbacks, shortcomings and limitations. The present invention addresses these limitations of the prior art along with today's requirements and needs for providing a more compact, durable, long lasting and relatively low cost lift axle assembly for effectively and efficiently lowering the axle and wheels in the in use position for transferring part of the vehicle load through the axle and wheels to the road surface and for efficiently and easily raising the auxiliary axle and wheels up and under the wheeled vehicle frame when the auxiliary axle and wheels are not needed.

SUMMARY OF THE INVENTION

It is the principal object of the present invention to overcome the above-discussed disadvantages associated with prior lift axle assemblies and to provide a lift axle assembly which provides improved longevity, durability, compactness and efficiency of use.

The present invention overcomes the disadvantages of prior lift axle assemblies and provides improved characteristics by providing a lift axle assembly including a support frame which is attached to the wheeled vehicle preferably on the wheeled vehicle frame between the rear driven wheels and the front steering wheels and/or behind the rear driven wheels. The support frame includes a pair of support hangers extending vertically downwardly. A first set of upper and lower support arms are pivotally connected to one of the support hangers and a second set of upper and lower support arms are pivotally connected to the other of said support hangers. The liftable auxiliary axle includes a pair of saddles and the first set of upper and lower support arms are pivotally connected to one of the saddles and the second set of upper and lower support arms are pivotally connected to the other of said saddles. Preferably, the upper and lower support arms of each set are attached to their respective support hanger and saddle in a manner and at locations such that a parallelogram is formed and the support arms remain parallel to each other at all times. Wheels are attached to the axle in a known and customary manner. A pair of support air springs are provided between the lift axle and/or saddles and the wheeled vehicle frame so that, when inflated, a lifting force is provided or, stated differently, part of the load is transmitted from the wheeled vehicle frame through the support air springs and to the axle and wheels.

A pair of lift air springs are also provided, each located between a support hanger and the upper support arm which is pivotally attached to that support hanger. For lifting the axle and wheels, the support air springs are deflated while the lift air springs are inflated thereby causing both sets of upper and lower support arms to rotate vertically upwardly about their pivotal connection to the support hangers and thereby also causing the auxiliary axle and wheels to be lifted upwardly and underneath the wheeled vehicle. For placing the auxiliary axle and wheels in their in use position with the wheels in contact with the road surface, the lift air springs are deflated and the support air springs are inflated.

While the axle is in its in use position with the wheels in contact with the road surface, depending on the road surface terrain, bumps and other obstructions in the road, quite often one end of the axle is caused to pivot upwardly along with the support arms thereat and against the force of the support air spring thereat while simultaneously, the other end of the axle remains in a lower position. This condition, referred to herein as "a one wheel lift condition" or twisting of the auxiliary axle, places severe twisting and stresses on the support arms of the assembly. Further, because the lift air springs are located to one side of the support arms a twisting force or moment is placed on the upper support arms and yet different stresses are experienced by the support arms and their pivotal connections during the lifting of the auxiliary axle and/or during the time when the axle and wheels are placed in and retained in the storage position up and underneath the wheeled vehicle frame. So as to compensate for these various stresses and increase the durability and longevity of the lift axle assembly, in accordance with the principles of the present invention, the pivotal connections of the lower support arms to the support hangers and saddles are bushings for allowing pivotal motion about an axis of rotation which is perpendicular to the support arm and generally parallel to the auxiliary axle. Further, the bushing connections also allow coning motion of the support arms to a position whereat the axis of rotation remains perpendicular with the longitudinal axis of the support arm but wherein it is no longer horizontally disposed. That is, the support arms are allowed to twist about their longitudinal axis. As can be appreciated, this coning motion compensates for and allows for the twisting of the axle with respect to the support arms during one wheel lift conditions. The upper support arm pivotal connections to the support hangers are also provided with a bushing type pivotal connection allowing both pivotal motion about the axis of rotation which is parallel to the axle and, also, allowing coning motion wherein the axis of rotation is no longer horizontally disposed and the support arm is allowed to pivot about its longitudinal axis. The pivotal connections between the upper support arms and the respective saddles, however, are provided with an antitwist type of connection which allows pivotal motion substantially only about the axis of rotation and which prevents coning. The antitwist pivotal connection retains the axis of rotation substantially parallel with the axle and prevents twisting of the upper support arms about their longitudinal axis. Thus, although the upper support arm is allowed to twist during one wheel lift conditions in view of its bushing pivotal connection to the support hanger, it is prevented from twisting about its longitudinal axis when the lift air spring is inflated thereby forcing the upper support arm vertically upwardly and placing of the axle and wheels in their storage position.

At each of the antitwist pivotal connections, the upper support arms include a cylindrical portion which is sandwiched between a pair of walls which are attached to the saddles. A pivot bolt extends through the saddle walls and coaxially through the upper support arm cylindrical portion. A hardened steel pivot tube is received coaxially around the pivot bolt and between the saddle walls. A cylindrically shaped bearing sleeve is coaxially located between the pivot tube and the upper support arm cylindrical portion for allowing relatively free rotational motion of the support arm cylindrical portion about the axis of rotation which is coaxial with the pivot bolt. A thrust washer is located at each end of the bearing sleeves and support arm cylindrical portions. The thrust washers are sandwiched between the saddle walls and the bearing sleeve and support arm cylindrical portion and are received coaxially around the pivot tube. Preferably, the bearing sleeve includes an inner cylindrical surface made of Teflon or some other low friction coating material and an outer cylindrical surface made of bronze and steel and is sized so that it may be functionally retained within the support arm cylindrical portion. A port or grease fitting is provided through the support arm cylindrical portion and the bearing sleeve for applying grease to the low friction coating and for further reducing friction and wear thereat.

In one form thereof, the present invention is directed to a lift axle assembly for a wheeled vehicle including a lift axle support frame attachable to the wheeled vehicle. A pair of saddles are attached to an axle. A first set of upper and lower support arms are provided and are pivotally connected between one of the saddles and the support frame. A second set of upper and lower support arms are also provided and are pivotally connected between the other of the saddles and the support frame. In each of the first and second sets of support arms, at least one of the pivotal connections are bushings allowing pivotal motion about an axis of rotation and coning, and one of the pivotal connections are antitwist allowing pivotal motion substantially only about an axis of rotation and preventing coning.

BRIEF DESCRIPTION OF THE DRAWINGS

The above-mentioned and other features and objects of the present invention and the manner of obtaining them will become more apparent and the invention itself will be better understood by reference to the following description of an embodiment of the invention taken in conjunction with the accompanying drawings wherein:

FIG. 1 is a perspective view of a lift axle assembly constructed in accordance with the principles of the present invention;

FIG. 2 is left side elevation view of the lift axle assembly shown in FIG. 1, the right side thereof incorporating the same structure and being a mirror image thereof;

FIG. 3 is a top plan view of the lift axle assembly shown in FIG. 2;

FIG. 4 is a front elevation view of the lift axle assembly shown in FIG. 2;

FIG. 5 is an enlarged cross sectional view taken generally along line 5—5 in FIG. 2 and showing a bushing pivotal connection; and, FIG. 6 is an enlarged cross sectional view taken generally along line 6—6 in FIG. 2 and showing an antitwist pivotal connection constructed in accordance with the principles of the present invention.

Corresponding characters indicate corresponding parts throughout the several views of the drawings.

The exemplification set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENT

Referring initially to FIG. 1, a lift axle assembly for a wheeled vehicle constructed in accordance with the principles of the present invention is shown and generally designated by the numeral 10. Lift axle assembly 10 is adapted to be attached or mounted to horizontally disposed vehicle beams 12 on a wheeled vehicle such as a truck (not shown). The vehicle includes both a left and a right vehicle beam extending longitudinally from the front to the rear of the vehicle in a known and customary manner. The lift axle assembly 10 is adapted to be attached to both the left and right vehicle beams 12 as more fully discussed herein below.

Lift axle assembly 10 includes a support frame generally designated by the numeral 14 which is adapted to be attached to the vehicle beams 12. Support frame 14 includes a right support hanger 16 and left support hanger 18 each having an L-shaped mounting bracket 20 attached at its upper end. Right and left support hangers 16 and 18 along with their respective L-shaped mounting brackets 20 are essentially mirror images of one another and the L-shaped mounting brackets 20 face each other as shown in FIG. 1 so as to be mounted on the vehicle beams 12 which extend essentially horizontally and perpendicular to the support hangers 16 and 18. As best seen in FIGS. 1, 2 and 4, the L-shaped mounting brackets 20 are located on the outside and underneath vehicle beams 12 and are attached thereto via a plurality of bolts 22 shown in FIG. 2.

Right and left support hangers 16 and 18 further include inwardly extending gussets 24, each of which are attached to a cross member 26 extending therebetween. Inwardly extending gussets 24 are attached to the cross member 26 via a plurality of bolts 28. As can be appreciated, the inwardly extending gussets 24 along with the cross member 26 are provided for strengthening and stabilizing the position of support hangers 16 and 18.

At each right and left support hangers 16 and 18 there are provided upper support arms 30 and lower support arms 32 which are pivotally connected to the support hangers using bolts 34 and 36 respectively. At their other end, the upper and lower support arms 30 and 32 are pivotally attached to right and left saddles 38 and 40 by using bolts 42 and 44 respectively. As used herein, a set of upper and lower support arms includes one upper support arm 30 and one lower support arm 32. As best seen in FIG. 2, upper support arms 30 and lower support arms 32 are equidistant and the distance between pivot bolts 34 and 36 is the same as the distance between pivot bolts 42 and 44. Thus, upper support arms 30 and lower support arms 32 remain parallel to each other as they rotate vertically upwardly or counterclockwise about pivot bolts 34 and 36 as seen in FIG. 2. Similarly, saddles 38 and 40 along with the auxiliary axle 46 remain substantially horizontally disposed as upper and lower support arms 30 and 32 are pivoted vertically upwardly about pivot bolts 34 and 36. Thus, by maintaining the saddles and axle 46 in a horizontally controlled position, the caster angle as defined by SAE Standards remains constant throughout the upward and downward motion of the suspension where the motion is a result of road deflections or activation or deactivation of the lift mechanism.

As best seen in FIG. 2, saddles 38 and 40 include a lower mounting plate 48 attached to the auxiliary axle 46 via bolts 50. Axle 46 extends between the saddles 38 and 40 and outwardly therefrom as shown in FIG. 1. A wheel support hub 52 is attached to the auxiliary axle 46 at each end thereof and is adapted for mounting a wheel 54 (shown in a dash line in FIG. 2) in a known and customary manner. At the upper ends of saddles 38 and 40 a support plate 56 is provided whereupon the support air springs 58 rest and are attached with fasteners 103. At their upper ends, each of the support air springs 58 are attached to a support disk plate 60 via fasteners such as nuts 62. Additionally, mounting brackets 64 are provided and attached to the support disk plate 60 by welding other suitable means. Mounting brackets 64 and support disk plate 60 are used similar to the L-shaped mounting brackets 20 for mounting the upper end of the support air springs 58 to the wheeled vehicle beams 12 using bolts 66. Support air springs 58 are selectively inflated and deflated by available air pressure and controls in the wheeled vehicle in known and customary manner.

At each of the right and left support hangers 16 and 18, lift air springs 68 are provided and are supported and attached to lower lift brackets 70 via fasteners such as nuts 72. Lower lift brackets 70 are attached to the inwardly extending gussets 24 by also using the bolts 28. At their upper ends, the lift air springs 68 are attached to an upper lift bracket 74 via fasteners such as nuts 76. Upper lift brackets 74 are attached to the upper support arms 30 by welding or other suitable means. Lift air springs 68 are also selectively inflated and deflated by air pressure and controls available on the wheeled vehicle in a known and customary manner.

In operation, for placing the wheels 54 and axle 46 in the in use position as shown in FIG. 2, support air springs 58 are inflated while the lift air springs 68 are deflated thereby pushing the axle 46 and wheels 54 vertically downwardly and the placing the wheels 54 in contact with the road surface 78. In this position, a lifting force is provided by the lift axle assembly to the wheeled vehicle beams 12 through the support air springs 58. However, because the road surface is not always uniform, a one wheeled lift condition is quite often encountered during which the left or right wheel 54 is raised against the force of its air spring 58 while the other wheel 54 remains in a lower position. During such one wheel lift condition, because saddles 40 are rigidly affixed to the axle 46, upper and lower support arms 30 and 32 are caused to twist about their longitudinal axes. As more fully discussed hereinbelow, such twisting is anticipated and accounted for by providing bushing type pivot connections of the type shown in FIG. 5 at pivot bolts 34, 36 and 44.

When the auxiliary axle 46 is no longer needed, such as when the vehicle is no longer heavily loaded, the support air springs 58 are deflated and the lift air springs 68 are inflated for placing a vertical force on the upper support arms 30 and causing the upper support arms 30 along with the lower support arms 32 to pivot counterclockwise as seen in FIG. 2 about pivot bolts 34 and 36, and generally vertically upwardly. This in turn causes saddles 38 and 40 along with axle 46 and wheels 54 to be lifted vertically upwardly and underneath the vehicle beams 12 and, thereby, also lifting the wheels 54 off of the road surface 78. Because lift air springs 68 are on the inside of support arms 30 and 32, the lifting force thereof being transmitted through the upper lift brackets 74 causes the upper support arms 30 to pivot about their longitudinal axes. This can cause binding and fatigue in the upper support arm pivotal connections thereby limiting the life of such pivotal connections. As more fully discussed hereinbelow, so as to compensate and account for this, the pivotal connections between the upper support arms 30 and the saddles 38 and 40 at pivot bolts 42 are of the antitwist type as shown in FIG. 6, whereby, during the inflating of lift air springs 68 and lifting of the axle 46 and wheels 54, the upper support arms 30 are stabilized and prevented from twisting about their longitudinal axes thereby preventing binding and increasing the durability of the assembly. However, because the pivotal connections at pivot bolts 34, 36 and 44 are of a bushing type as shown in FIG. 5, sufficient flexibility is provided so as to compensate for and account for one wheel lift conditions while the auxiliary axle 46 and wheels 54 are in use.

Referring now to FIG. 5, a bushing type pivotal connection cross sectional view taken along line 5—5 at pivot bolt 36 of FIG. 2 is shown and is also representative of the type of pivotal connection provided at pivot bolts 34 and 44. The bushing type pivotal connection of FIG. 5 is provided between two side walls 80 of hanger brackets 16 and 18, although in the pivotal connection of bolt 44, the side walls are formed by and part of the saddles 38 and 40. As shown, pivot bolt 36 extends through holes 82 in side walls 80 of right and left support hangers 16 and 18. Bolt 36 is located coaxial with the axis of rotation 84 and is retained thereat via a nut 86 and washer 88. An inner metal bushing 90 is coaxially received around bolt 36 and extends between the side walls 80. The tightening of nut 86 onto bolt 36 frictionally secures side walls 80 against the longitudinal ends of inner metal bushing 90. Around the inner metal bushing 90 a rubber bushing 92 and an outer metal bushing 94 are provided, again, coaxially with the bolt 36 and the axis of rotation 84. It is noted that the outer metal bushing 94 is not necessarily required and may or may not be provided. Finally, a cylindrical portion 96 formed integrally with or otherwise attached to the support arms 32 or 30 is provided coaxially around the outer metal bushing 94. Thrust washers 98 are provided by mounting around the inner metal bushing 90 at the longitudinal ends of the rubber bushings 92, outer metal bushing 94 and the cylindrical portion 96, and are sandwiched therebetween and the side walls 80.

In operation, the tolerances between the inner metal bushing 90, rubber bushings 92, outer metal bushing 94, and the cylindrical portion 96 are such that the support arms 30 and 32 can generally easily rotate or pivot about the axis of rotation 84. Furthermore, in the event that the support arm is caused to twist about its longitudinal axis, the rubber bushing 92 provides flexibility such that the entire support arm, along with its cylindrical portion 96, twist about the support arm longitudinal axis at an angle depicted in FIG. 5 as α (alpha) and which is referred to herein as coning. As can be appreciated, the flexibility of the rubber bushing 92 as well as its thickness are provided and sized such that sufficient twisting or coning is allowed depending on the axle length, length of the support arms, and other parameters of the lift axle assembly.

Referring now to FIG. 6, the antitwist type of pivotal connection of pivot bolts 42 are shown. Pivot bolts 42 extend through holes 100 of the saddle side walls 102. A pivot tube 104 made of hardened steel or similar durable wear resistant material is provided coaxially around the pivot bolt 42 and the axis of rotation 106, and is longitudinally sandwiched between the saddle side walls 102. By tightening the nut 86 onto the bolt 42, saddle side walls 102 are forced or compressed longitudinally against the pivot tube 104, thereby, fixing the longitudinal distance between the saddle side walls 102. A continuous or split bearing sleeve is also provided coaxially around the pivot tube 104 and includes an inner cylindrical portion or surface 108 made of Teflon or other low friction material adhered to the base bearing cylindrical portion or surface 110 made of bronze which itself is laminated to an outer support sleeve 111 made of steel. The cylindrical portion 96 of the upper support arm 30 is located coaxially around the bearing sleeve. Preferably, the Teflon cylindrical portion 108 is formed with and is affixed to the base bronze cylindrical portion 110, the bronze bearing base 110 is then laminated to the outer steel support sleeve 111, and the outer steel support sleeve 111 is frictionally press fit into the cylindrical portion 96 of the upper support arm 30. Thus, a sliding surface is provided between the inner Teflon cylindrical portion 108 and the pivot tube 104. A grease fitting and port (not shown) is also preferably provided extending through the cylindrical portion 96 and the bearing sleeve for forcing grease or other lubricating fluid between the bearing sleeve Teflon cylindrical portion 108 and the pivot tube 104 and thereby further reducing friction and wear thereat. Finally, thrust washers 98 are provided by mounting around the pivot tube 104 at each longitudinal end of the bearing sleeve made up of cylindrical portions 108 and 110 and the cylindrical portion 96 and sandwiched therebetween and the saddle side walls 102. In operation, the upper support arms 30 are allowed to pivot or rotate about the axis of rotation 106. However, unlike the bushing connection of FIG. 5, in the antitwist pivotal connections of pivot bolts 42 coning is essentially prevented and the upper support arms 30 are thus essentially prevented from twisting about their longitudinal axes thereat.

As can be appreciated, the various components of the lift axle assembly 10, including for example support hangers 16 and 18, support arms 30 and 32, saddles 38 and 40, etc., are all made of metal and preferably by stamping operations as may be needed for achieving the necessary shapes and rigidity.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A lift axle assembly for a wheeled vehicle comprising:
   a lift axle support frame attachable to a wheeled vehicle;
   a pair of saddles attached to an axle;
   a first set of upper and lower support arms pivotally connected between one of said saddles and said support frame;
   a second set of upper and lower support arms pivotally connected between the other of said saddles and said support frame;
   bushing means in at least one of said pivotal connections of each of said first and second sets of support arms for allowing pivotal motion about an axis of rotation and coning; and
   antitwist means in at least another one of said pivotal connections of each of said first and second sets of support arms for allowing pivotal motion substantially only about an axis of rotation and preventing coning.

2. The lift axle assembly of claim 1, wherein in each of said first and second sets of support arms, three of said pivotable connections are bushings means for allowing pivotal motion about an axis of rotation and coning.

3. The lift axle assembly of claim 2 wherein said antitwist means are located between said upper support arms and said saddles or support frame.

4. The lift axle assembly of claim 2 wherein said antitwist means are located between said upper support arms and said saddles.

5. The lift axle assembly of claim 4 wherein at each of said antitwist means said support arms include a cylindrical portion sandwiched between a pair of walls attached to said saddles, a pivot bolt extends through said saddle walls and coaxially through said arm cylindrical portions, and a bearing sleeve is located coaxially between said arm cylindrical portions and said pivot bolt.

6. The lift axle assembly of claim 5 wherein said bearing sleeve is made of Teflon material.

7. The lift axle assembly of claim 6 further comprising a pivot tube at each of said antitwist means coaxial with and received between said bearing sleeve and said pivot bolt.

8. The lift axle assembly of claim 7 wherein said bearing sleeves include a inner cylindrical surface made of Teflon, a base bearing cylindrical surface made of bronze, and an outer support surface of steel.

9. The lift axle assembly of claim 7 further comprising, at each of said antitwist means, a pair of thrust washers located coaxially around said pivot tube and between said bearing sleeve and said saddle walls.

10. The lift axle assembly of claim 5 further comprising lift members located between said support frame and each of said upper support arms, whereby said upper support arms along with said lower support arms, saddles and axle are selectively lifted.

11. The lift axle assembly of claim 10 wherein said support frame includes a pair of support hangers and wherein said first set of upper and lower support arms are pivotally connected to one of said support hangers and said second set of upper and lower support arms are pivotally connected to the other of said support hangers.

12. The lift axle assembly of claim 11 wherein said upper and lower support arms are pivotally attached between said support hangers and said saddles at locations whereby said upper and lower support arms remain parallel to each other.

13. The lift axle assembly of claim 12 wherein said bearing sleeve is made of Teflon material.

14. The lift axle assembly of claim 13 further comprising a pivot tube at each of said antitwist means coaxial with and received between said bearing sleeve and said pivot bolt.

15. The lift axle assembly of claim 3 further comprising lift members located between said support frame and each of said upper support arms, whereby said upper support arms along with said lower support arms, saddles and axle are selectively lifted.

16. The lift axle assembly of claim 15 wherein said support frame includes a pair of support hangers and wherein said first set of upper and lower support arms are pivotally connected to one of said support hangers and the said second set of upper and lower support arms are pivotally connected to the other of said support hangers.

17. The lift axle assembly of claim 1 wherein said antitwist means are located between said upper support arms and said saddles.

18. The lift axle assembly of claim 1 wherein at each of said antitwist means said support arms include a cylindrical portion sandwiched between a pair of walls attached to said saddles, a pivot bolt extends through said saddle walls and coaxially through said arm cylindrical portions, and a bearing sleeve is located coaxially between said arm cylindrical portions and said pivot bolt.

19. The lift axle assembly of claim 18 wherein said bearing sleeve is made of Teflon material.

20. The lift axle assembly of claim 19 further comprising a pivot tube at each of said antitwist means coaxial with and received between said bearing sleeve and said pivot bolt.

21. The lift axle assembly of claim 20 wherein said bearing sleeve includes a inner cylindrical surface made of Teflon, a base bearing cylindrical surface made of bronze, and an outer support surface of steel.

22. The lift axle assembly of claim 20 further composing at each of said antitwist means, a pair of thrust washers located coaxially around said pivot tube and between said bearing sleeve and said saddle walls.

23. The lift axle assembly of claim 1 further comprising lift members located between said support frame and each of said upper support arms, whereby said upper support arms along with said lower support arms, saddles and axle are selectively lifted.

24. The lift axle assembly of claim 1 wherein said support frame includes a pair of support hangers and wherein said first set of upper and lower support arms are pivotally connected to one of said support hangers and said second set of upper and lower support arms are pivotally connected to the other of said support hangers.

25. The lift axle assembly of claim 1 wherein said upper and lower support arms are pivotally attached between said support hangers and said saddles at locations whereby said upper and lower support arms remain parallel to each other.

* * * * *